US007016047B2

(12) United States Patent
May (10) Patent No.: US 7,016,047 B2
(45) Date of Patent: Mar. 21, 2006

(54) ACTIVE Q-POINT STABILIZATION FOR LINEAR INTERFEROMETRIC SENSORS

(75) Inventor: Russell May, Blacksburg, VA (US)

(73) Assignee: Prime Photonics, Inc., Blacksburg, VA (US)

( * ) Notice: Subject to any disclaimer, the term of this patent is extended or adjusted under 35 U.S.C. 154(b) by 313 days.

(21) Appl. No.: 10/670,457

(22) Filed: Sep. 26, 2003

(65) Prior Publication Data

US 2004/0119981 A1 Jun. 24, 2004

Related U.S. Application Data

(60) Provisional application No. 60/413,468, filed on Sep. 26, 2002.

(51) Int. Cl.
*G01B 9/02* (2006.01)

(52) U.S. Cl. .................. 356/480; 356/450; 356/519

(58) Field of Classification Search ........... 356/450, 356/477–480, 483, 497, 519
See application file for complete search history.

(56) References Cited

U.S. PATENT DOCUMENTS 4,853,534 A * 8/1989 Dakin .................. 356/483
4,873,989 A * 10/1989 Einzig .................. 356/479
5,301,001 A 4/1994 Murphy et al.

OTHER PUBLICATIONS

Yu, et al., "Fiber Fabry-Perot Sensors for Detection of Partial Discharges In Power Transformers", Applied Optics, vol. 42, No. 16, Jun. 2003.

* cited by examiner

*Primary Examiner*—Gregory J. Toatley, Jr.
*Assistant Examiner*—Patrick Connolly
(74) *Attorney, Agent, or Firm*—DLA Piper Rudnick; Gray Cary US LLP (57) ABSTRACT

A linear interferometric sensor system in which the light output from the interferometric sensor is optically bandpass filtered before conversion to an electrical signal by an adjustable band-pass filtering device and the center wavelength of the adjustable band-pass filtering device is controlled by a feedback circuit responsive to the steady state component of the electrical signal corresponding to the filtered sensor return. In a preferred embodiment, the adjustable band-pass filtering device is an electrically tunable optical filter. The invention is particularly useful in self calibrating interferometric/intensity-based sensor configuration, but can be used with other linear interferometric sensor configurations.

22 Claims, 6 Drawing Sheets

ACTIVE Q-POINT STABILIZATION FOR LINEAR INTERFEROMETRIC SENSORS

This application claims priority from U.S. Provisional Application Ser. No. 60/413,468 filed Sep. 26, 2002. The entirety of that provisional application is incorporated herein by reference.

BACKGROUND OF THE INVENTION

1. Field of the Invention

The invention relates to optical sensors generally, and more particularly to linear interferometric optic sensors.

2. Discussion of the Background

Several types of optical sensors (fiber optic or otherwise) are known, including intensity based and interferometric sensors. Intensity-based sensors are typically processed by detecting an intensity of light transmitted by, or attenuated by, the sensor as a function of a fluctuating measurand (e.g., pressure, temperature, etc.) The systems for processing the output of such sensors are relatively uncomplicated; however, they are sensitive to signal fading due to perturbations in operating parameters other than the measurand. Examples of intensity-based sensors include the pressure-induced long period grating sensors described in co-pending U.S. patent application Ser. No. 10/431,456, entitled "Optical Fiber Sensors Based On Pressure-Induced Temporal Periodic Variations In Refractive Index" filed on May 8, 2003.

Interferometric sensors typically involve the creation of a plurality of interference fringes as a function of a fluctuating measurand. The processing systems for interferometric sensors, which must count these fringes, are typically more complex, and therefore more costly, than the processing systems for intensity-based sensors. These systems are also subject to fringe direction ambiguity (i.e., a change in direction of the measurand at a peak or trough of a fringe may not be detected). However, interferometric sensor systems involving fringe counting are not as sensitive to non-measurand operating parameter drifts as intensity-based sensors. Such systems may employ a Fabry-Perot cavity, which (as discussed in U.S. Pat. No. 5,301,001) may be formed in an optical fiber (referred to as an intrinsic Fabry-Perot sensor), or between an end of an optical fiber and a reflector (referred to as an extrinsic Fabry-Perot sensor). However, the invention is not so limited and may be used with other types of interferometric sensors (e.g., Fizeau cavities and Michelson, Mach-Zehnder, and Sagnac interferometers).

In some interferometric sensor systems, the sensor is constrained to operate over a linear region of an interference fringe. Such systems are referred to as linear interferometric sensor systems. A particularly advantageous example of such a linear interferometric sensor system, which is referred to as the SCIIB (Self-Calibrated Interferometric/Intensity Based) sensor configuration, was invented by Dr. Anbo Wang to combine the best features of interferometric sensors and intensity-based sensors. The SCIIB sensor configuration involves splitting a return from a sensor into which broadband light has been input into two channels: an unfiltered reference signal in which no interference is observed, and a signal channel which is optically filtered to narrow the spectrum such that coherence length of the light in the signal channel exceeds the difference in length of the optical paths of the reflections in the sensor, which results in interference. For example, when the sensor is a Fabry-Perot cavity, the coherence length of the light in the signal channel exceeds twice the length of the Fabry-Perot cavity. In the SCIIB sensor configuration, the interferometric sensor is constructed such that the output intensity remains within the quasi-linear part of one of the interference fringes, which is about ⅙ of a period, such that the output intensity from the sensor is linearly proportional to the length of the cavity. The length of the cavity in turn changes in response to an applied pressure, or an applied load (force), so the output intensity can be related to the applied pressure or force.

In the SCIIB sensor system and in other types of linear interferometric sensor systems, in order to maximize the operating range of the sensor, it is necessary to construct the sensor so that in the absence of an applied measurand (pressure or force or temperature), the output intensity is in the optimal location of the sensor response. This output intensity in the absence of an applied measurand is commonly referred to as the quiescent point or Q-point. Unfortunately, maintaining the Q-Point in the optimal location is difficult. For a system that uses an optical source centered at 1.3 $\mu$m, the quasi-linear part of a fringe corresponds to a change in Fabry-Perot cavity length of only about 100 nm. Assembling the sensor to fix the Q-Point in the optimal location requires assembly tolerances on the order of tens of nanometers, which is very difficult. In addition, changes in the physical dimensions of the sensor due to thermal expansion or contraction resulting from temperature changes will cause a drift in the Q-Point from the optimal location.

BRIEF SUMMARY OF THE INVENTION

The present invention addresses the aforementioned issues to a great extent by providing methods and apparatuses for stabilizing the Q-point of a linear interferometric sensor system (including, but not limited to SCIIB sensor systems) in which the light from an interferometric sensor is optically bandpass filtered with an adjustable bandpass filtering device. The center wavelength of the adjustable band-pass filtering device is controlled by a feedback circuit responsive to a steady state component of an electrical signal resulting from the conversion of the filtered optical return signal from the sensor.

In a preferred embodiment, an output of the interferometric sensor is connected to an electrically tunable optical filter. The filtered optical signal is converted to an electrical signal which is input to a feedback circuit that produces a feedback signal that is used to control the an electrically tunable optical filter so that the Q point remains at a desired location. In a highly preferred embodiment, the feedback circuit comprises a low pass filter with an input connected to an output of a photodetector in the signal channel and an output connected to an input of a differential amplifier. A second input of the differential amplifier is connected to a reference voltage representing a desired set point. The output of the differential amplifier is connected to an electrical control input of the electrically tunable optical filter.

BRIEF DESCRIPTION OF THE DRAWINGS

A more complete appreciation of the invention and many of the attendant features and advantages thereof will be readily obtained as the same become better understood by reference to the following detailed description when considered in connection with the accompanying drawings, wherein.

DETAILED DESCRIPTION

The present invention will be discussed with reference to preferred embodiments of linear interferometric sensor systems. Specific details are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

The present invention is believed to be particularly useful in the context of a SCIIB sensor system and hence will be discussed primarily in that context herein. The invention should not be understood to be limited to a SCIIB sensor system but rather should be understood to be applicable to a wide variety of interferometric sensor systems.

Figure 1:
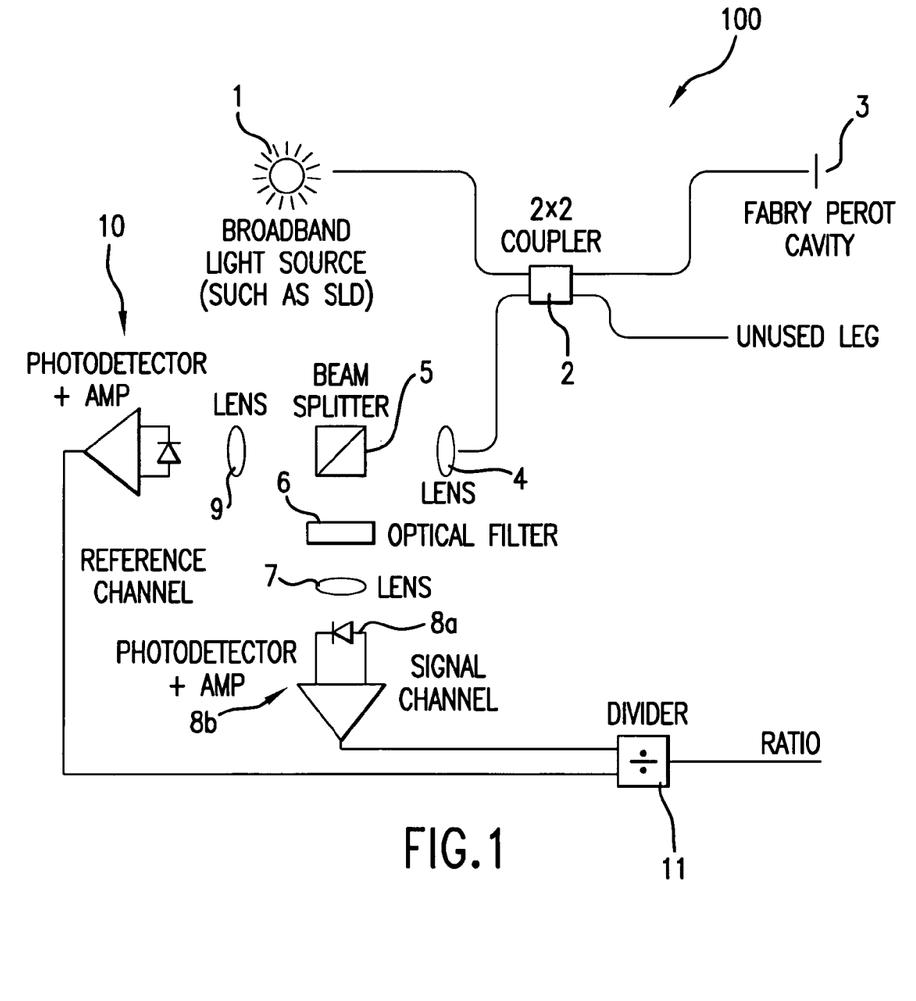
FIG. 1 is a block diagram indicating a conventional SCIIB sensor configuration.

A conventional SCIIB sensor configuration 100 is illustrated in FIG. 1. In the SCIIB sensor configuration 100, light from a broadband source 1 is guided though a 2×2 coupler 2 into an interferometric sensor such as a Fabry-Perot cavity 3. Reflections are generated by the two reflectors in the cavity 3, which are guided through the coupler to a first lens 4, which collimates the light. This collimated light is split into two beams by a beam splitter 5. One beam (in the signal channel) is passed through an optical band pass filter 6, to reduce the spectral width of the light. After it passes through the filter 6, it passes through a second lens 7, which serves to focus it onto a photodetector 8a. A preamp 8b is then used to convert the photo current to a voltage. The other beam (the reference channel) passes through a third lens 9 and is focused on a second photodetector 10a, without optical filtering. The output of the photodetector 10a is converted to a voltage by preamp 10b.

Figure 2:
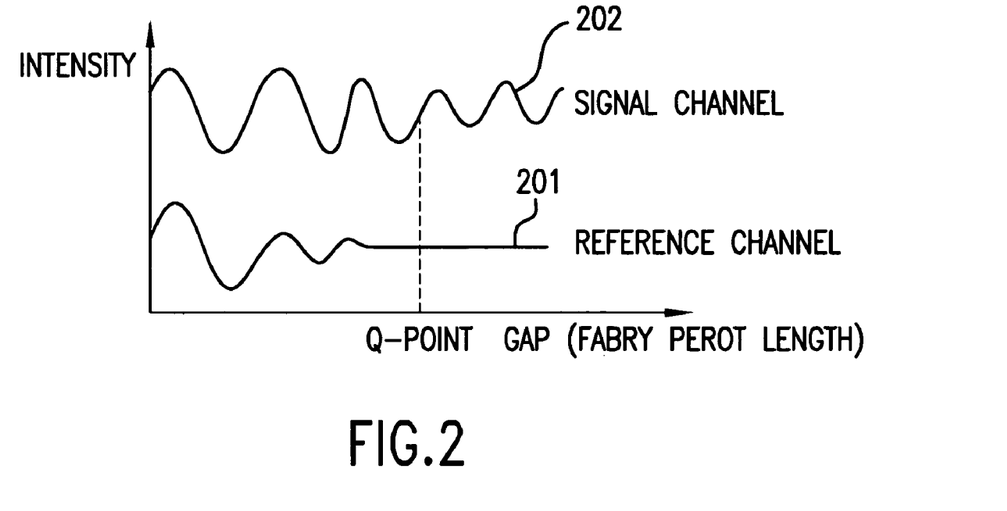
FIG. 2 is a plot of intensity as a function of cavity length in the reference and signal channels of the SCIIB sensor configuration of FIG. 1.

In the SCIIB sensor configuration 100, the difference in optical path lengths of the two reflections from cavity 3 (which is twice the length of cavity 3) is chosen to exceed the coherence length of the broadband light source 1, so that no interference is exhibited in the output of the reference channel. That is, the length of cavity 3 is chosen to correspond to a flat portion of the reference channel intensity plot 201 of FIG. 2. However, the spectral width of the light beam in the signal channel is narrowed by optical filter 6 such that its coherence length exceeds the optical path length of the cavity 3. This results in observable interference in the signal channel as illustrated by the signal channel plot 202 of FIG. 2. By taking the ratio of the signal channel to the reference channel at divider 11, effects that are common mode to both channels (such as fiber bend loss or source fluctuations) are canceled out.

Figure 3:
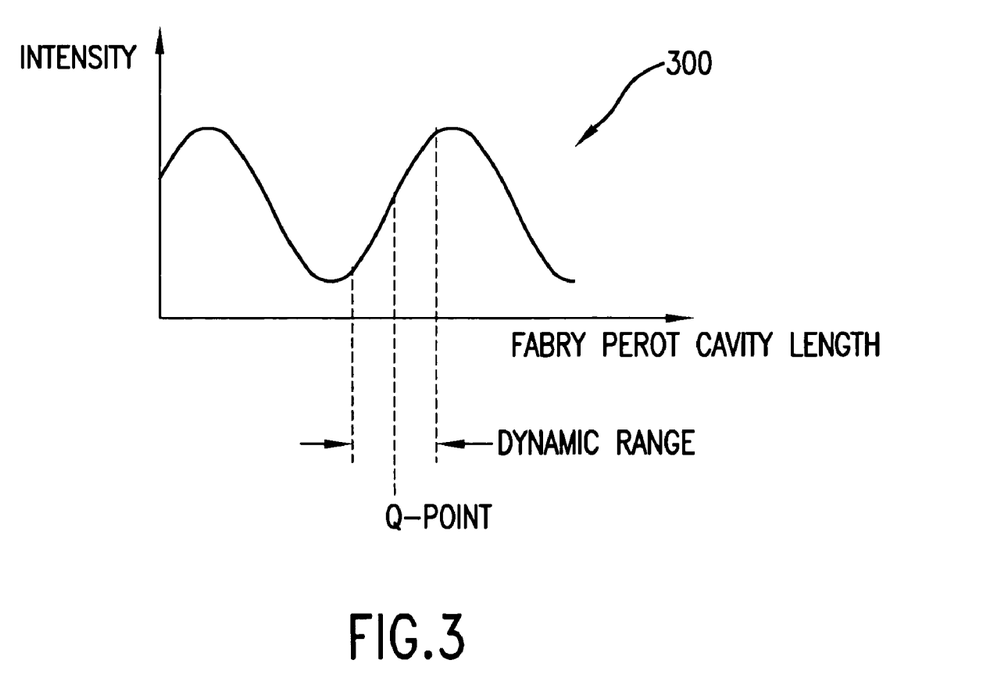
FIG. 3 is a plot of intensity as a function of cavity length illustrating a desired Q-point in one embodiment of the SCIIB sensor configuration of FIG. 1.

To simplify the processing required for non-linear interferometric sensors, the Fabry-Perot cavity 3 is preferably constructed so that the voltage output remains within the quasi-linear part of one of the fringes (about ⅙ of a period) as shown in FIG. 3. In that case, the output intensity from the cavity 3 is linearly proportional to the length of the cavity. The length of the cavity in turn changes in response to an applied pressure, or an applied load (force), so the output intensity can be related to pressure or force.

As discussed above, to maximize the operating range of the sensor, it is necessary to construct the sensor so that the output intensity in the absence of an applied measurand, i.e., the Q point, is in the optimal location of the sensor response. For example, if it is expected that the measurand will vary in either of two directions (in the case of strain, either tension or compression) from the "resting" state, then the optimal location for the Q point is midway between the two extremes of the quasi-linear part of a fringe as shown in the plot 300 of FIG. 3. Those of skill in the art will recognize that the optimal location for the Q point will be at one or the other of the extremes of the quasi-linear part of a fringe in cases where the measurand will only vary in one direction, and that the Q point may be located anywhere between the two extremes in other cases, depending on the possible or allowable variance of the cavity length.

Figures 4A, 4C:
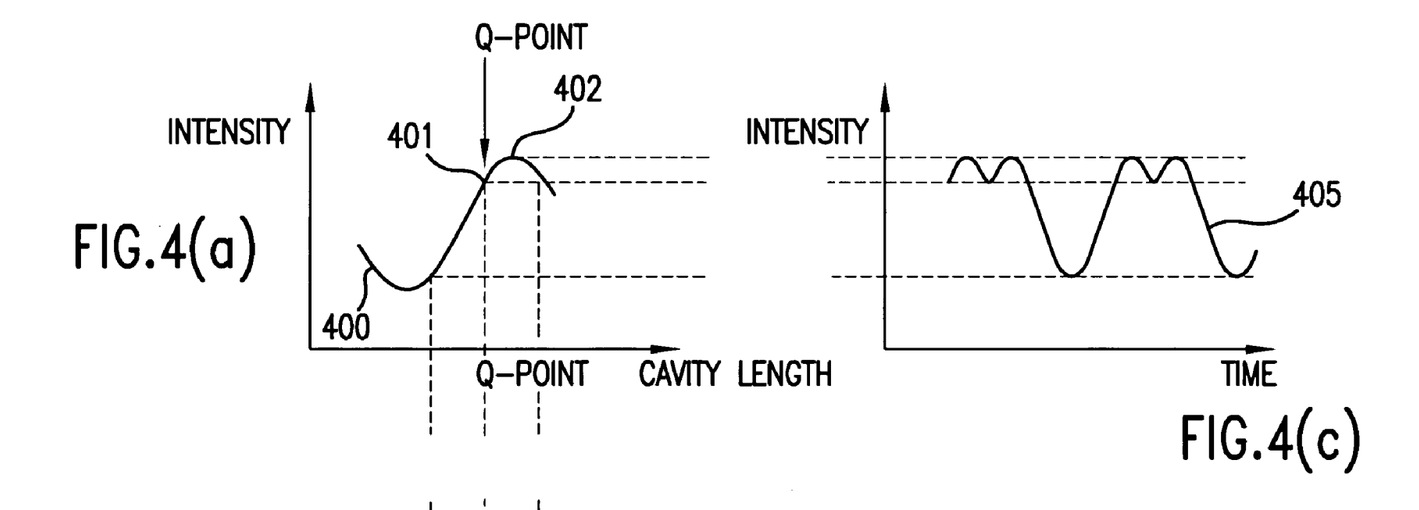
FIGS. 4a, 4b and 4c are plots illustrating a non-desirable Q-point in a SCIIB sensor configuration.

As discussed above, maintaining the Q-Point in the optimal location is difficult. FIG. 4 shows the case for a Fabry-Perot sensor in which the Q-point is not at the optimal location at a midpoint of the quasi-linear part of a fringe. FIG. 4(a) shows a plot 400 of the intensity output by the sensor as a function of cavity length. In the hypothetical case illustrated in FIG. 8, the Q-point 401 is just below the peak 402 of a fringe.

Figure 4B:
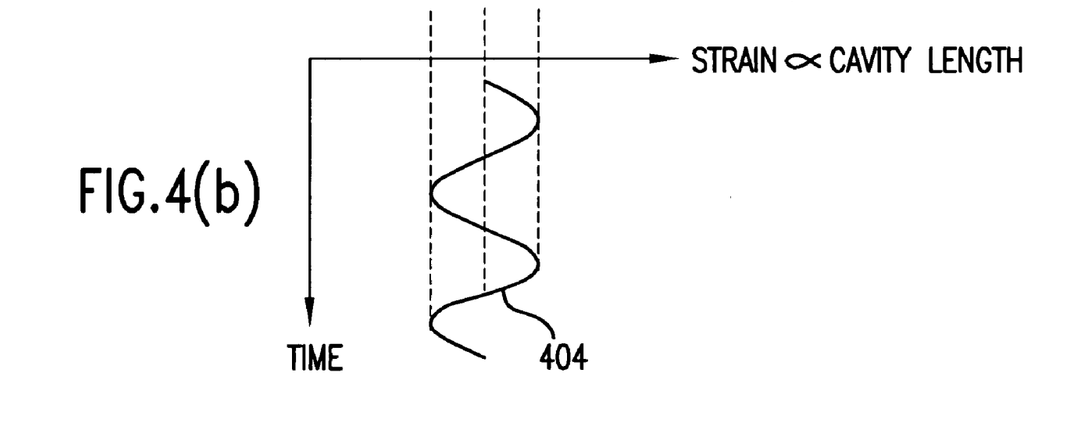

FIG. 4(b) shows a plot 404 of sinusoidally time varying strain applied to the Fabry-Perot cavity (note that the graph of FIG. 4(b) has been rotated by 90° from the usual convention). From mechanics, the resulting cavity length is proportional to the applied strain. In this hypothetical case, the maximum (peak) strain stretches the cavity length to a length that causes the Fabry-Perot output to "go past" the peak of the fringe and then decrease. For the case of sinusoidally varying strain input, the output intensity as shown in the plot 405 of FIG. 4(c) would not be sinusoidal, but would have local dips in the output. Accordingly, a processing system that calculates a measurand (e.g., temperature, strain or pressure) as a linear function of the output intensity would report erroneous results.

Figure 5:
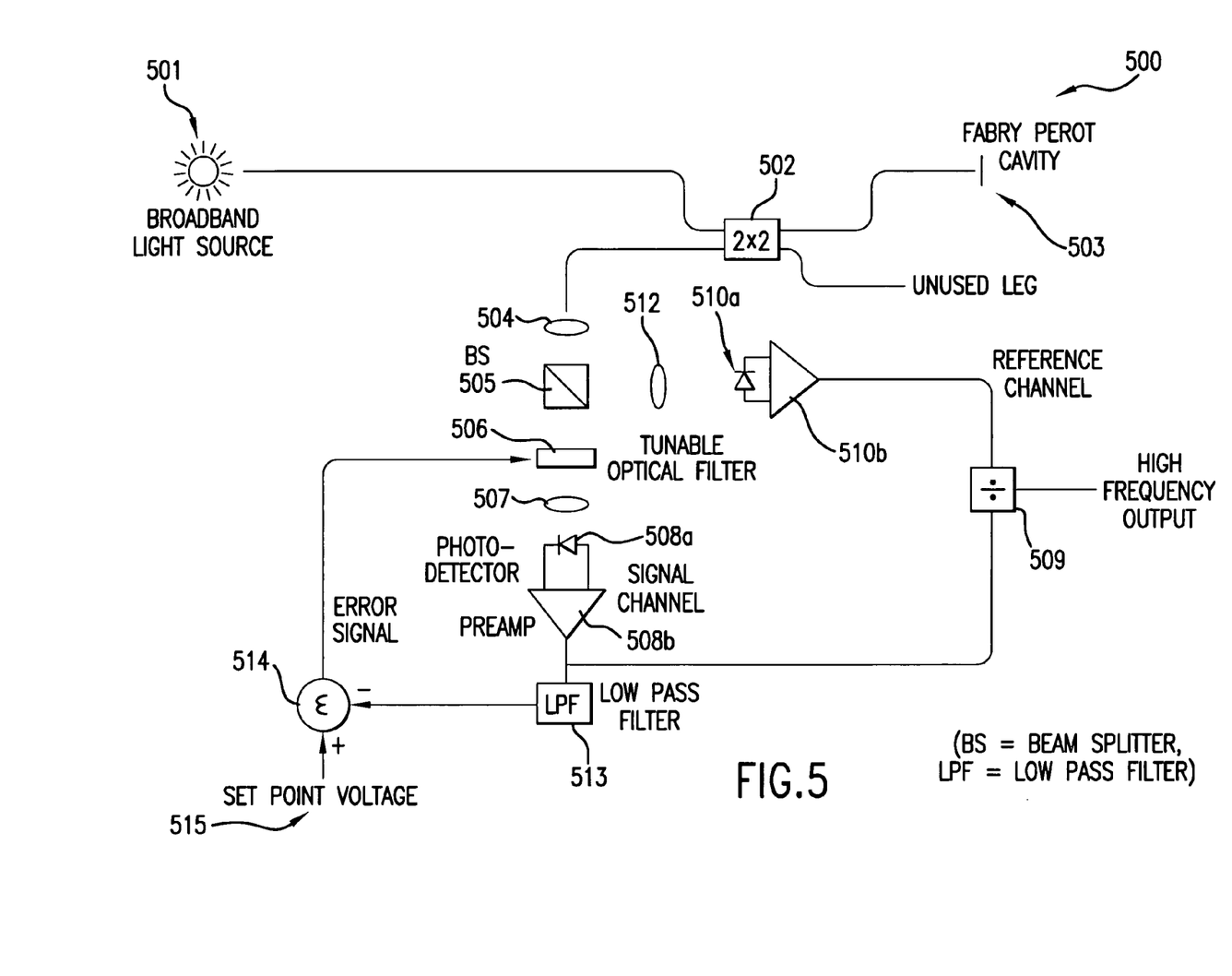
FIG. 5 is a block diagram illustrating a SCIIB sensor configuration according to an embodiment of the present invention.

The present invention addresses the problems associated with maintaining the Q point at an optimum location by replacing fixed optical filter 6 in the signal channel of the conventional SCIIB system 100 of FIG. 1 with a tunable optical filter to permit active Q-Point stabilization. FIG. 5 illustrates a SCIIB sensor configuration 500 including a tunable optical filter 506 according to one embodiment of the invention. Micron Optics makes electrically tunable Fabry-Perot optical filters that are well suited for this application (e.g., part number FFP-SI).

Figure 6:
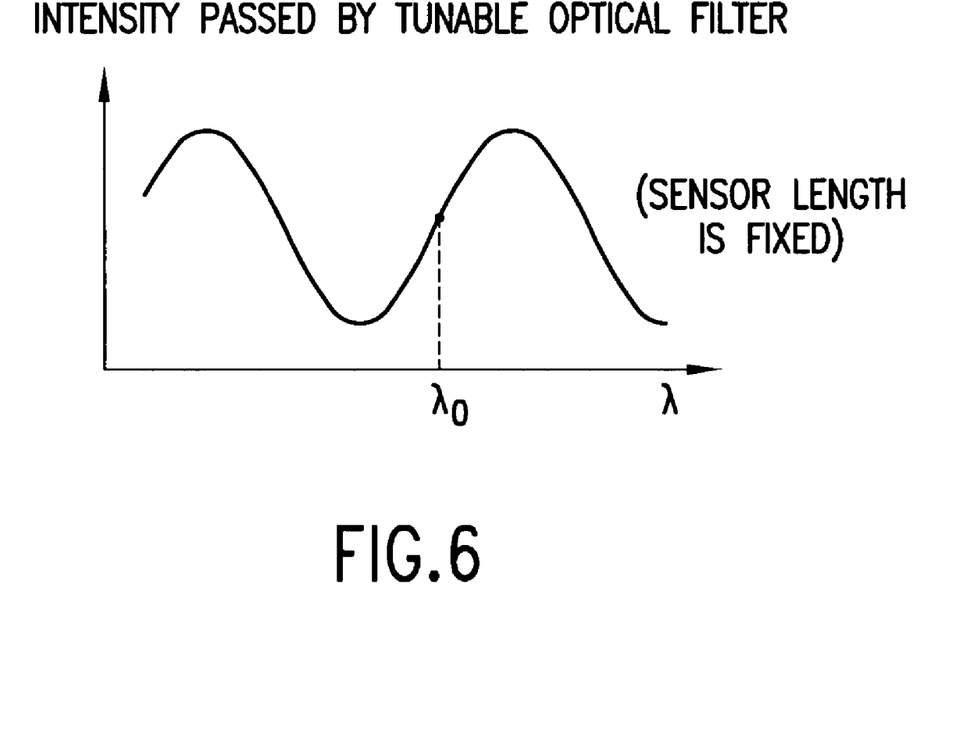
FIG. 6 is a plot of intensity as a function of cavity length indicating a Q-point for the sensor configuration of FIG. 5.

The intensity of the light detected by the photodetector in the signal channel depends not only on the length of the Fabry-Perot cavity (sensor), but also on the center wavelength of the pass band of the tunable optical filter 506. As shown in FIG. 6, if the sensor cavity length is fixed, then the intensity passed by the tunable optical filter is a function of center wavelength λ of the tunable filter. Since the intensity varies as $$I(\lambda) = I_o \sin\left(\frac{4\pi L}{\lambda}\right),$$

(where $I_0$ is the peak intensity and L is the fixed length of the sensor cavity), the intensity varies as the sine of $1/\lambda$.

In order to achieve an optimal Q-Point for a signal that varies around the zero input point in both the positive and negative direction, it is desirable to adjust the center wavelength of the tunable optical filter so that the output intensity is midway (at the center) of the quasi-linear part of a fringe. This corresponds to $\lambda_0$ in FIG. 6.

To achieve this, the output of the preamp 508b connected to the photodetector 508a in the signal channel is tapped off and directed to a low pass electronic filter (LPF) 513. The low pass filter 513 blocks the high frequency component of the signal channel, and passes only the slowly varying component of the signal from the sensor cavity 503 that includes mechanical and thermal drifts. The slowly varying component of the signal that includes mechanical and thermal drifts shall be referred to herein as the "steady state component." In some embodiments, the low pass filter blocks frequencies greater than 5 Hz (the frequency limit of the low pass filter 513 is application dependent and may differ in other embodiments).

The steady state component of the signal is then applied to the inverting input of an amplifier 514 (such as an op amp set up as a differential amplifier). A fixed voltage 515 (the set point voltage) is applied to the positive input of the amplifier 514. If the output of the low pass filter 513 equals the set point voltage 515, then the amplifier 514 outputs zero voltage. If the LPF 513 output differs from the set point voltage 515, then an error signal voltage is generated by the amplifier 514. This error voltage is applied to the input of the tunable filter 506. In some embodiments, an amplifier may be required to boost the error voltage to the required input range of the tunable filter. The error voltage output by the amplifier 514 causes the tunable filter 506 to adjust the center wavelength of its passband so that the center wavelength corresponds to the midpoint of a fringe, such as $\lambda_0$ in FIG. 6. With this change in wavelength passed by the tunable filter 506, the steady state signal passed by the low pass filter 513 changes, and if the Q-Point is at the desired location, then the voltage out of the low pass filter 513 equals the set point voltage 515 and the error voltage generated by the amplifier 514 is again zero.

If the only effect causing a change in the sensor cavity length is thermal drift due to the chance in temperature, then the error signal from the amplifier 514 is proportional to temperature, and it would be possible to use the error signal to measure temperature.

Figure 7:
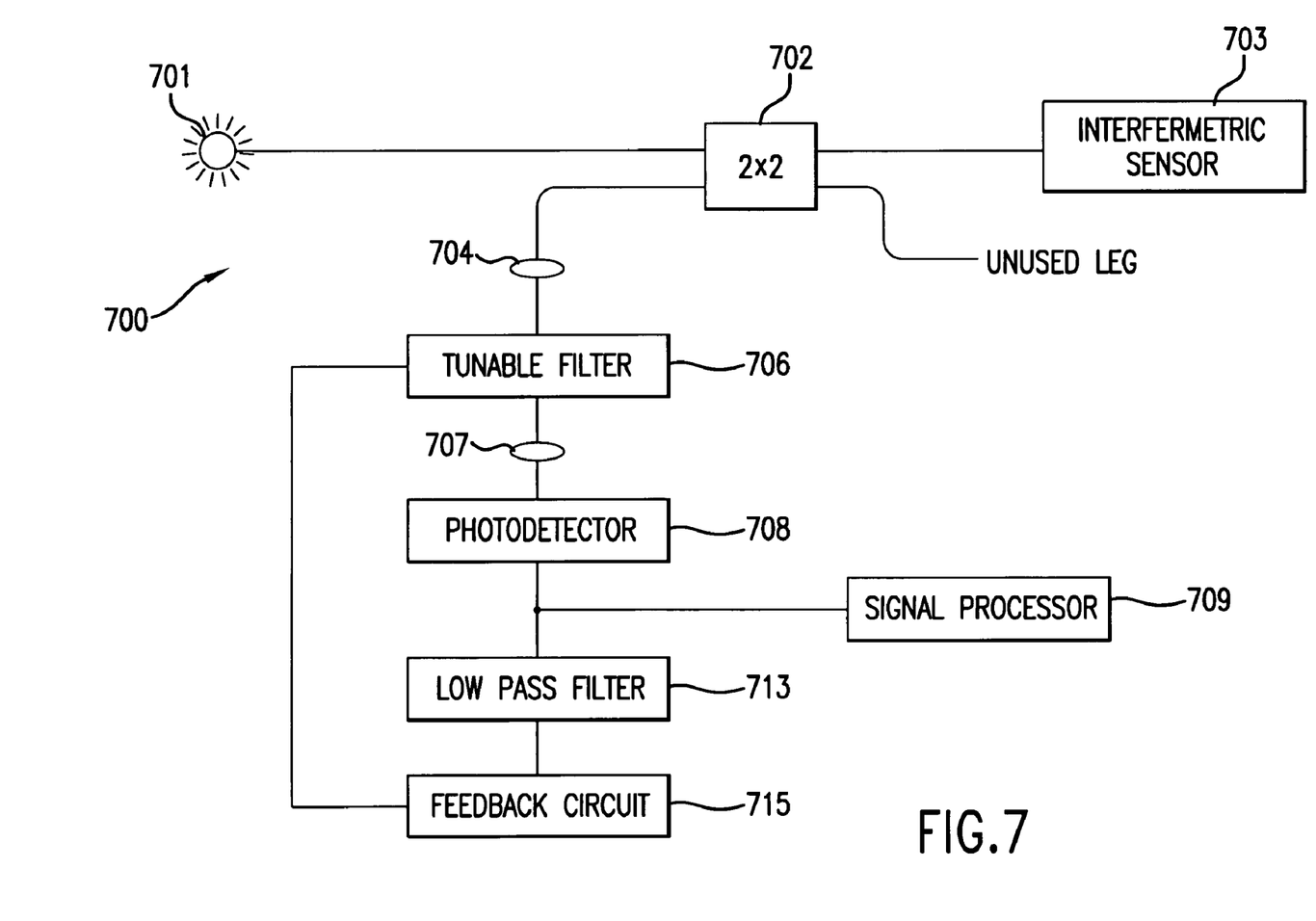
FIG. 7 is a block diagram of a general linear interferometric system including Q-point stabilization according to an embodiment of the present invention.

It will be recognized by those of skill in the art that the electrically tunable optical filter 506 in the SCIIB sensor system of FIG. 5 may be used in conjunction with any linear interferometric sensor system to achieve Q-point stabilization. A more general linear interferometric sensor system 700 is illustrated in FIG. 7. A light source 701 transmits light through 2×2 coupler 702 to interferometric sensor 703. Light is reflected back through 2×2 coupler 702 and lens 704 to tunable bandpass filter 706. The filtered light from bandpass filter 706 is optionally collimated by lens 707 and is focused on the photodetector 708. A signal processor 709, which employ any one of a number of schemes known in the art, processes the output of the photodetector 708 to calculate the measurand. The output of the photodetector 708 is also input to low pass filter 713. Low pass filter 713 isolates the steady state component of the photodetector output, which is input to feedback circuit 715 for generating a feedback control signal to adjust the center frequency of the tunable bandpass filter 706 to maintain the Q-point at the desired location.

Techniques for stabilizing the Q-point of an interferometric sensor system have been discussed above. This technique involves bandpass filtering an optical output of an interferometric sensor, converting the optical output to an electrical signal, comparing a steady state component of the electrical signal that is representative of the Q-point rather than changes in the measurand to a set point, generating a feedback signal based on the comparison, and using the feedback signal to adjust a center wavelength of the optical bandpass filter to maintain the Q-point in a desired location. While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed is:

1. A method for controlling a quiescent point of a linear interferometric sensor system comprising the steps of:
    illuminating an interferometric sensor with a light source;
    filtering light reflected by the interferometric sensor with an adjustable device, the adjustable device having a pass band, the pass band having a center frequency;
    converting the filtered light to an electrical signal;
    generating a feedback signal based on a steady state component of the electrical signal and a set point; and
    using the feedback signal to control the adjustable device such that a quiescent point of the sensor system is maintained at a desired location corresponding to the set point.

2. The method of claim 1, wherein the interferometric sensor comprises a Fabry-Perot cavity.

3. The method of claim 1, wherein the interferometric sensor comprises a Fizeau cavity.

4. The method of claim 1, wherein the interferometric sensor is a fiber optic sensor.

5. The method of claim 1, wherein the interferometric sensor is a Michelson interferometer.

6. The method of claim 1, wherein the interferometric sensor is a Mach-Zehnder interferometer.

7. The method of claim 1, wherein the adjustable device is an electrically tunable optical filter.

8. The method of claim 1, further comprising the step of filtering the electrical signal with a low pass filter to isolate the steady state component of the electrical signal.

9. The method of claim 1, further comprising the step of calculating a temperature based in part on the feedback signal.

10. The method of claim 1, wherein a broadband light source is used to illuminate the interferometric sensor.

11. The method of claim 1, wherein the interferometric sensor system is a self-calibrating interferometric/intensity-based (SCIIB) system in which light with a coherence length less than a cavity length of the interferometric sensor is used to illuminate the interferometric sensor, light reflected by the interferometric sensor is split into a reference channel and a signal channel and the filtering step is performed only for light in the signal channel, the light in the reference channel and the filtered light in the signal channel are converted into corresponding electrical signals, and a ratio of the corresponding electrical signals is formed to cancel effects common to both channels.

12. A linear interferometric sensor system comprising:
a light source;
an interferometric sensor;
a coupler connected to the light source and the interferometric sensor;
an adjustable device connected to the coupler to receive light reflected by the interferometric sensor, the adjustable device having a pass band, the adjustable device being configured to filter out light reflected by the interferometric sensor at frequencies outside of the pass band and pass light reflected by the interferometric sensor within the pass band;
a first photodetector connected to receive light passed by the adjustable device, the first photodetector being configured to convert the light passed by the adjustable device into a first electrical signal;
a feedback circuit connected to receive the first electrical signal from the first photodetector, the feedback circuit being configured to output a feedback signal to control the adjustable device such that a quiescent point of the sensor system remains at a desired location, the feedback signal being based on a steady state component of the electrical signal and a set point corresponding to the desired location.

13. The system of claim 12, wherein the interferometric sensor comprises a Fabry-Perot cavity.

14. The system of claim 12, wherein the interferometric sensor comprises a Fizeau cavity.

15. The system of claim 12, wherein the interferometric sensor is a fiber optic sensor.

16. The system of claim 12, wherein the interferometric sensor is a Michelson interferometer.

17. The system of claim 12, wherein the interferometric sensor is a Mach-Zehnder interferometer.

18. The system of claim 12, wherein the interferometric sensor is a Sagnac interferometer.

19. The system of claim 12, wherein the adjustable device is an electrically tunable optical filter.

20. The system of claim 12, wherein the feedback circuit comprises a low pass filter connected to receive the first electrical signal, the feedback circuit being configured to isolate the steady state component of the electrical signal.

21. The system of claim 20, wherein the feedback circuit further comprises an amplifier, the amplifier being connected to an output of the low pass filter and to a set point voltage, the amplifier being configured to output the feedback signal, the feedback signal being proportional to a difference between the set point and the output of the low pass filter.

22. The system of claim 12, further comprising:
a beam splitter connected between the coupler and the adjustable device, the beam splitter being configured to split the light reflected by the interferometric sensor into a reference channel and a sensor channel, the sensor channel being connected to the first photodetector;
a second photodetector connected to convert light from the reference channel into a second electrical signal; and
a divider connected to receive the first electrical signal and the second electrical signal and output a ratio of the first and second electrical signals.

* * * * *